Oct. 5, 1926.

N. BADDING 1,602,094

COMBINED VEHICLE SIGNAL, SPOTLIGHT, AND MIRROR

Filed Oct. 28, 1922

INVENTOR.
Nicholas Badding
BY M. C. Frank
ATTORNEY

Patented Oct. 5, 1926.

1,602,094

UNITED STATES PATENT OFFICE.

NICHOLAS BADDING, OF OAKLAND, CALIFORNIA, ASSIGNOR, BY MESNE ASSIGNMENTS, TO JOHN H. BOLTON, OF BERKELEY, CALIFORNIA.

COMBINED VEHICLE SIGNAL, SPOTLIGHT, AND MIRROR.

Application filed October 28, 1922. Serial No. 597,518.

This invention relates, in general, to attachments for motor vehicles, and in particular, to a combined signal, spot light and mirror for such vehicles.

A prime object of the invention, is to dispense with the separate units enumerated as now on the market and used, and combine them into a unit device, an inexpensive and separate article of manufacture, light in weight, attractive in appearance and efficient in service.

The invention includes the assembly of five units of service in a single barrel-type casing, to wit;—indicators for right turn, left turn, and stop, and a spot light and a backview mirror. Also, the arrangement of the direction and stop indicators so that they may show both toward the front and toward the rear of the vehicle.

With the above and other objects in view, the invention consists in certain novel features of construction, form and arrangement of parts. The accompanying sheet of drawings, forming a part of this specification illustrates an embodiment of my invention, and what I claim as new, is particularly pointed out in the appended claims following the specification.

Figure 1:
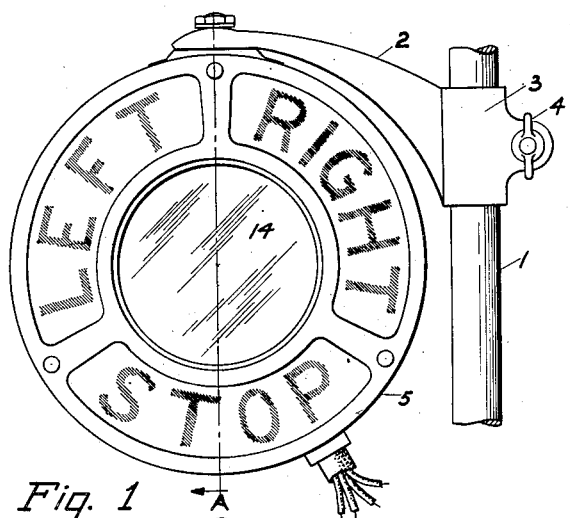
Figure 1 is an elevation of the apparatus as it appears to the driver, and from the rear of the vehicle. And shows also the bracket, by which it is connected to a stanchion of the wind shield.
Figure 2:
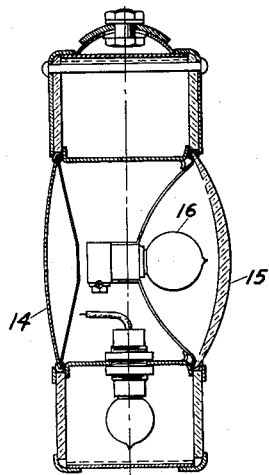
Figure 2 is a median section taken on the vertical line A, of Figure 1, some parts being shown in full.
Figure 3:
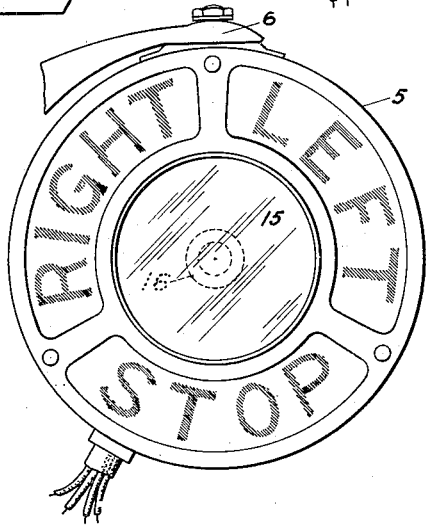
Figure 3 is a face view of the apparatus as it appears from the front of the vehicle.
Figure 4:
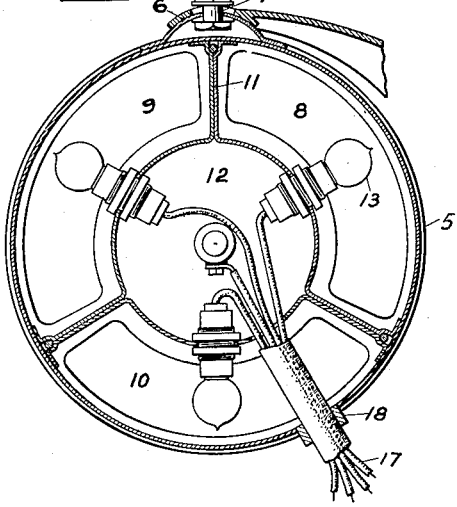
Figure 4 is a diametric section taken on the vertical line B, of Figure 2, some parts being shown in full.

Referring to the drawing and the figures thereof:—To a stanchion of the wind shield represented by the numeral 1, is adjustably secured a bracket 2, by means of a split sleeve 3 and a thumb screw 4. To the end of the bracket, remote from the stanchion, is hung the barrel-type casing 5 by means of the adjustable joint 6 and the bolt 7.

The casing 5 is divided at its circumferential margin into three segments 8, 9 and 10. These segments are divided from each other by partitions 11, which extend from one end of the casing to the other end thereof and may be continued to separate the segments from the central space 12. Within each segment is a light 13, and on both faces of the segments are the indicia for right turn, left turn, and stop, respectively, made visible by the said light.

The central space 12 is closed on the rear by a mirror 14, for giving a rear view, and on the front by a lens 15, behind which is a light 16, forming a spot light for projecting light rays forward of the vehicle.

The faces of the segments 8, 9, and 10 may be covered with glass, or other transparent medium having delineated thereon the indicia mentioned, or they may be covered with opaque material having the indicia perforated therethrough. In either case the light 13, effectively signals the intention of the driver of the vehicle.

The casing 5, may naturally be of any desired form, but the barrel-type harmonizes with the regular headlights of the vehicle.

The adjustable joint at 6, permits the casing 5 to be variously turned and moved by the driver as seems desirable.

The lights may be energized by current passing through wires 17, passing through a bushing 18 in the lower part of casing 5 to avoid water drip. The wires extend to buttons or switches, not shown, within reach of the driver.

Having illustrated and described my invention in its preferred form, I wish it to be understood that the same may be modified as practice suggests. Therefore, the patent protection that I desire is all of that which comes within the spirit and scope of the invention as claimed.

I claim:—

1. An automobile signal and service attachment, comprising a bracket securable to a wind shield stanchion, a barrel-type casing of cylindrical section hung to said bracket by an adjustable joint formed at the union of the two elements, said barrel-type casing containing three circumferential compartments, said compartments separated from each other and from the central space by opaque partitions, said partitions comprising two straight end sections and an intermediate curved section, each of said compartments housing a light and having signal indicia on its front and rear face, and the central space closed by service elements comprising a mirror facing the rear and a spot light facing the front, means securing said spotlight in the casing and means securing said mirror in the casing.

2. An automobile attachment of the class described comprising a cylindrical section, a face plate for each end of the section, said plates provided with central and circumferential registering apertures, walls in said section dividing the latter into compartments substantially extending from one end of the section to the other end thereof and registering with the apertures of the plates, one aperture of the central compartment closed by a spot light and the other aperture by a mirror, and the circumferential apertures closed by glass segments having signal indicia thereon, and each of the said circumferential apertures housing a light to render the indicia visible through the apertures of both face plates, means securing said spotlight in the casing and means securing said mirror in the casing.

3. An automobile attachment of the class described comprising a cylindrical section, a face plate for each end of the section, said plates provided with central and circumferential registering apertures, partitions in said section dividing the section into circumferential compartments and a central compartment extending from one end of the section to the other end thereof registering with the apertures of the plates, each of said partitions comprising two straight end portions secured to the section and an intermediate curved portion defining said central compartment having flanges thereon for spacing said face plates, one aperture of the central compartment closed by a spot light and the other aperture by a mirror, and the circumferential apertures closed by glass segments having signal indicia thereon, and each of the said circumferential apertures housing a light, means securing said spotlight in the casing and means securing said mirror in the casing.

In testimony whereof I affix my signature.

NICHOLAS BADDING.